US008005058B2

(12) United States Patent  (10) Patent No.:  US 8,005,058 B2
Pecen  (45) Date of Patent:  *Aug. 23, 2011

(54) METHODS AND APPARATUS FOR USE IN SWITCHING COMMUNICATION OPERATIONS BETWEEN A WIRELESS WIDE AREA NETWORK AND A WIRELESS LOCAL AREA NETWORK

(75) Inventor: Mark E. Pecen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 198 days.

This patent is subject to a terminal disclaimer.

(21) Appl. No.: 12/366,206

(22) Filed: Feb. 5, 2009

(65) Prior Publication Data

US 2009/0135798 A1  May 28, 2009

Related U.S. Application Data

(63) Continuation of application No. 11/335,807, filed on Jan. 18, 2006, now Pat. No. 7,505,446.

(51) Int. Cl.
*H04W 40/00* (2009.01)
(52) U.S. Cl. ............... 370/338; 370/328; 370/236.2; 370/395.1; 370/396; 455/425; 455/441; 455/552; 455/553
(58) Field of Classification Search .......... 370/338, 370/348, 236.2, 395.1, 395–396; 455/441, 455/552–553, 425, 552.1
See application file for complete search history.

(56) References Cited

U.S. PATENT DOCUMENTS 6,035,212 A  3/2000  Rostoker et al.
(Continued)

FOREIGN PATENT DOCUMENTS

CA  2398185 A1  7/2002
(Continued)

OTHER PUBLICATIONS

Smadi, Mohammed; Azhari, Vahid; Todd, Terence D.; "A Measurement-Based Study of WLAN to Cellular Handover"; IEEE document, Dated 2006.

(Continued)

*Primary Examiner* — Charles N Appiah
*Assistant Examiner* — Michael T Vu
(74) *Attorney, Agent, or Firm* — John J. Oskorep, Esq.

(57) ABSTRACT

Methods and apparatus for use by a mobile communication device in switching operation for communications from a wireless wide area network (WWAN) to a wireless local area network (WLAN) are disclosed. While providing operation for communications in the WWAN, the mobile device continually maintains visited cell site history information in its memory. The visited cell site history information is indicative of one or more visited cell sites of the WWAN that served the mobile device over a moving time period of its operation. The mobile device continually monitors the visited cell site history information to identify whether it has been contained within a local geographic region over the moving time period. When the mobile device is identified to have been contained within the local geographic region, it is permitted to operate for communications with the WLAN. In response to such permission, the mobile device may enable its WLAN radio transceiver and select the WLAN for communications. Advantageously, switching operation for communications from the WWAN to the WLAN is performed only when appropriate. The WLAN radio transceiver may be enabled only when needed, which reduces power consumption and saves battery life in mobile device.

25 Claims, 10 Drawing Sheets

U.S. PATENT DOCUMENTS

| | | |
|---|---|---|
| 6,243,581 B1 | 6/2001 | Jawanda |
| 6,393,261 B1 | 5/2002 | Lewis |
| 6,754,206 B1 * | 6/2004 | Nattkemper et al. ......... 370/369 |
| 6,909,899 B2 | 6/2005 | Wang et al. |
| 7,633,915 B1 * | 12/2009 | Lewis ........................... 370/338 |
| 2002/0136226 A1 | 9/2002 | Christoffel et al. |
| 2002/0191575 A1 | 12/2002 | Kalavade et al. |
| 2003/0134636 A1 | 7/2003 | Sundar et al. |
| 2003/0134650 A1 | 7/2003 | Sundar et al. |
| 2004/0127208 A1 | 7/2004 | Nair et al. |
| 2004/0170191 A1 | 9/2004 | Guo et al. |
| 2004/0199637 A1 | 10/2004 | Li et al. |
| 2004/0259541 A1 | 12/2004 | Hicks, III et al. |
| 2004/0266426 A1 | 12/2004 | Marsh et al. |
| 2005/0020286 A1 | 1/2005 | Lazaridis et al. |
| 2005/0059402 A1 | 3/2005 | Jagadeesan et al. |
| 2005/0096024 A1 | 5/2005 | Bicker et al. |
| 2005/0148353 A1 | 7/2005 | Hicks, III et al. |
| 2006/0035636 A1 | 2/2006 | Pirila |
| 2006/0126562 A1 | 6/2006 | Liu |
| 2006/0166699 A1 | 7/2006 | Aghvami et al. |
| 2006/0291419 A1 | 12/2006 | McConnell et al. |
| 2007/0297358 A1 | 12/2007 | Chang et al. |
| 2008/0096580 A1 | 4/2008 | Montemurro |
| 2008/0137626 A1 | 6/2008 | Choi et al. |
| 2008/0176579 A1 | 7/2008 | Abdel-Kader |
| 2009/0141685 A1 | 6/2009 | Berglund |

FOREIGN PATENT DOCUMENTS

| | | |
|---|---|---|
| EP | 0700227 A2 | 3/1996 |
| EP | 1231805 A1 | 8/2002 |
| EP | 1585354 A1 | 10/2005 |
| EP | 1596564 A2 | 11/2005 |
| EP | 1947875 A1 | 7/2008 |
| EP | 1978676 A1 | 10/2008 |
| GB | 2288301 A | 10/1995 |
| WO | 9731496 A1 | 8/1997 |
| WO | 0076145 A1 | 12/2000 |
| WO | 02054820 A2 | 7/2002 |
| WO | 03065654 A1 | 8/2003 |
| WO | 2004100452 A2 | 11/2004 |
| WO | 2007033485 A2 | 3/2007 |

OTHER PUBLICATIONS

Smadi, Mohammed; Todd, Terence D.; Zhao, Dongmei; Kezys, Vytautas; "Dynamicallly Anchored Conferencing Handoff For Dual-Mode Cellular/WLAN Handsets", IEEE document, Dated 2006.

International Preliminary Report on Patentability for PCT application PCT/CA2007/000056, Dated May 23, 2008.

Supplementary European Search Report for application EP07701687, Dated May 11, 2009.

Khadivi et al., "Dropping Rate Reduction in Hybrid WLAN/Cellular Systems by Mobile Ad Hoc Relaying", Wireless personal Communications, 2006, pp. 515-542, Springer.

* cited by examiner

300

METHODS AND APPARATUS FOR USE IN SWITCHING COMMUNICATION OPERATIONS BETWEEN A WIRELESS WIDE AREA NETWORK AND A WIRELESS LOCAL AREA NETWORK

CROSS-REFERENCE TO RELATED APPLICATION

The present application is a continuation of and claims priority to U.S. non-provisional patent application having application Ser. No. 11/335,807 and filing date of 18 Jan. 2006, now U.S. Pat. No. 7,505,446 which is hereby incorporated by reference herein.

BACKGROUND

1. Field of the Technology

The present application relates generally to mobile communication devices adapted to operate for communications in two or more different types of wireless communication networks, such as wireless wide area networks (WWANs) and wireless local area networks (WLANs), and more particularly to techniques for permitting the switching of communications between such networks.

2. Description of the Related Art

When a mobile communication device is designed to communicate through more than one physical radio domain, the mobile device must autonomously select one of the domains through which to communicate or attach. This is the case, for example, for mobile devices that support both wireless local area network (WLAN) and cellular radio access technologies, such as Global System for Mobile communications (GSM)/General Packet Radio Service (GPRS) or Universal Mobile Telecommunication Systems (UMTS). In such environments, the cellular radio fading channel environment exhibits very different characteristics than a WLAN fading channel environment. The cellular radio environment is optimized for wide area coverage, while the WLAN environment is optimized for very localized coverage.

For a GSM mobile device, cell selection rules outlined in 3GPP specification documents govern cell selection techniques. Specifically, 3GPP specifications teach how a GSM/UMTS mobile device selects different serving cells in idle and packet transfer modes of operation. See 3GPP TS 45.008, "Technical Specification; 3rd Generation Partnership Project; Technical Specification Group GSM/EDGE Radio Access Network; Radio subsystem link control," ($3^{rd}$ Generation Partnership Project (3GPP) Technical Specification); specifically clause 6.4 "Criteria for cell selection and reselection" and 6.6.2 "Path loss criteria and timings for cell reselection." The method taught in the 3GPP specification specifies a number of parameters, including a minimum RSSI required to access a candidate cell and a minimum amount of time the candidate cell should be the strongest in the list of monitored cells. A candidate cell may be selected by the mobile device for two different reasons: (1) the path loss criterion (C1) falls below zero for five (5) seconds (i.e. essentially no signal exists at the receiver), or (2) the calculated value of radio signal strength indicator (RSSI) criterion (C2) is greater than the C2 of serving cell for more than five (5) seconds.

Now consider the case where the mobile device is adapted to operate with multiple radio access technologies (RAT) and must autonomously select between a wide area cellular network (e.g. GSM/GPRS) and a WLAN. For example, the mobile device may initially operate in the GSM/GPRS network and be moved near a window or door that permits propagation of a very strong WLAN signal. If cell selection rules similar to that outlined in the 3GPP specification were utilized, the mobile device would likely select WLAN mode if (1) its RSSI exceeds a certain threshold level and (2) the RSSI of the candidate cell is stronger than the current serving cell for greater than some length of time (e.g. five or ten seconds).

However, it may be asked whether such technique would be suitable given the intention of the entire system. The answer would ultimately depend on whether the mobile device is likely to remain in the WLAN domain for some reasonable period of time. In the case above, it is unlikely that incurring the substantial overhead of selecting the WLAN would be desirable as the mobile device would likely reselect back to the cellular system almost immediately. It is believed that the intention of a suitable selection algorithm should be to select WLAN mode if the mobile device is likely to remain within its coverage area for some reasonable period of time. An important consideration for heterogeneous radio system selection is therefore not simply how fast the mobile device is physically traveling, but perhaps how often it has entered and exited cells and/or system boundaries.

BRIEF DESCRIPTION OF THE DRAWINGS

Embodiments of the present application will now be described, by way of example only, with reference to the attached figures. Same reference numerals are used in different figures to denote similar elements.

DETAILED DESCRIPTION OF THE PREFERRED EMBODIMENTS

Figure 1:
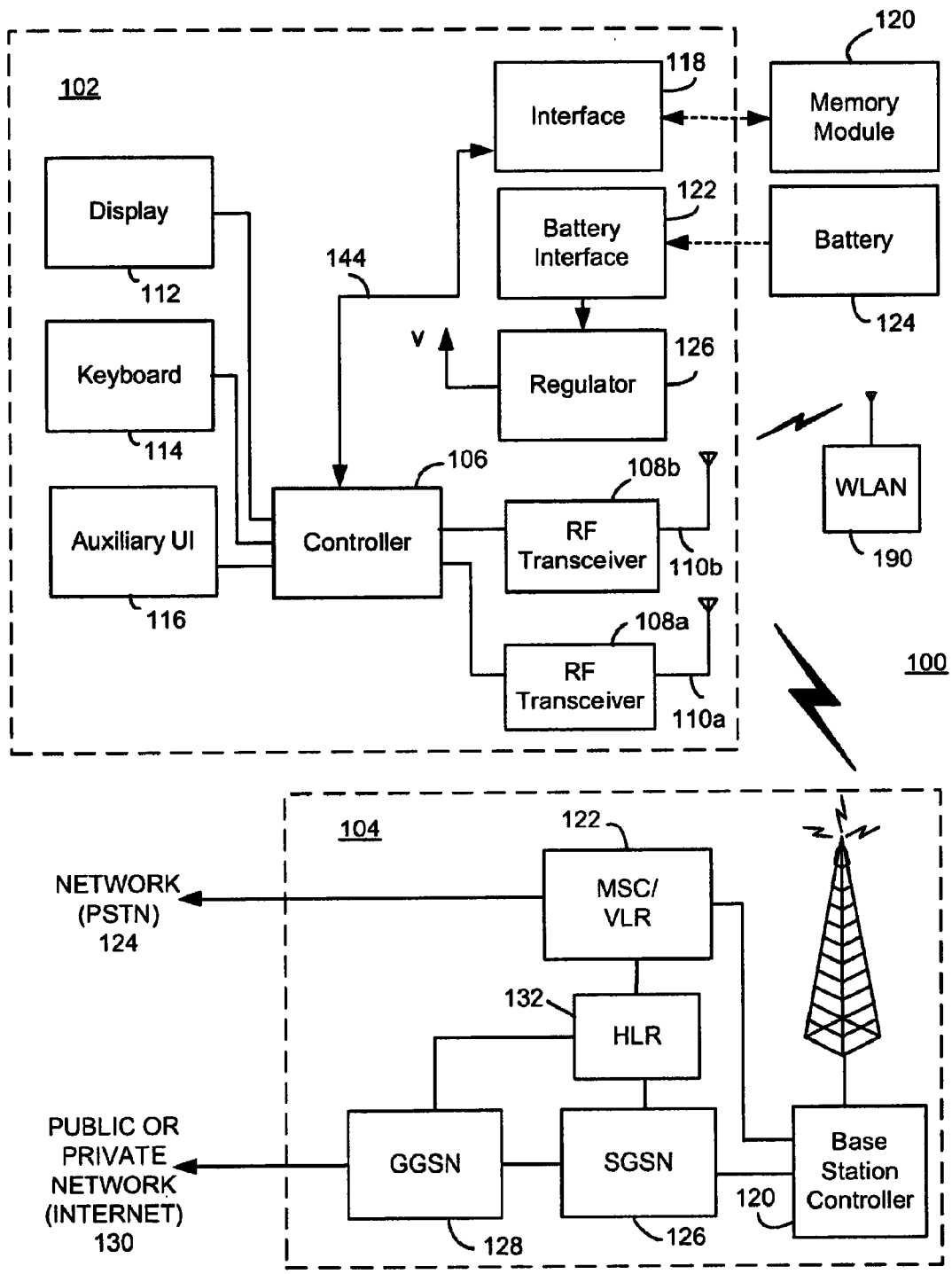
FIG. 1 is a schematic block diagram illustrating the basic components of a mobile communication device operating in a wireless communication system which includes a wireless wide area network (e.g. a GSM/GPRS wireless network) and a wireless local area network (WLAN)

Methods and apparatus for use by a mobile communication device in switching operation for communications from a wireless wide area network (WWAN) to a wireless local area network (WLAN) are described herein. While providing operation for communications in a first wireless communication network (e.g. the WWAN), the mobile device continually maintains visited cell site history information in its memory. The visited cell site history information is indicative of all of the cell sites (i.e. cell sites, cells, cell sectors, etc.) of the WWAN that served the mobile device over a moving time period of its operation. The visited cell site history information may be or include a list of visited cell sites that served the mobile device over the moving time period, a number of visited cell sites, a number of times that the mobile device visited each cell site over the moving time period, or some or all of the above, as examples. The mobile device continually monitors the visited cell site history information to identify whether it has been contained within a local geographic region over the moving time period. When the mobile device is identified to have been contained within the local geographic region, it is permitted to operate for communications in a second wireless communication network (e.g. the WLAN). In response to this permission, the mobile device operates to enable or activate its WLAN radio transceiver portion which was previously disabled or inactivated. If this permission is not granted, the mobile device operates to maintain operation for communications with the WWAN with its WWAN radio transceiver portion, and refrains from enabling or activating the WLAN radio transceiver portion. When the WLAN is available for communications with the mobile device, operation for communications is switched to the WLAN if it is determined that the mobile device is permitted to operate in the WLAN, but operation for communications is maintained in the WWAN if it is not so determined.

To help solve the problem of heterogeneous network selection for a mobile communication device, it is important to identify the basis for the problem: estimation of a mobile device's velocity. This velocity is not physical velocity of the mobile communication device, however, but rather logical velocity as defined by how long a mobile communication device is likely to remain in a given cell or radio access system. Thus, an important aspect for heterogeneous radio system selection is not simply how fast the mobile communication device is physically traveling, but how often it has entered and exited cells and/or system boundaries.

Techniques of the present application consider the operational environment as a universe of "visited cells" that served the mobile communication device over a given period of time. Thus, visited cell site history information of the wireless wide area network is continually stored and updated in memory of the mobile communication device over a moving time period of operation of the mobile device. The visited cell site history information may include different parameters, for example, the number of visited cell sites, the last time that the mobile communication device selected the given cell, the number of times the cell was selected by the mobile communication device, etc. This approach may be further developed by considering the universe of cells as a dynamic non-deterministic finite automaton (NFA), i.e., an NFA that dynamically grows and shrinks based primarily on two conditions: (1) the number of cells sites visited and (2) the last time each cell site was visited.

Based on the above approach, the visited cell site history information of the traversed environment may be used to provide an estimation of whether the mobile communication device is moving "quickly" or "slowly" through the environment. The greater the number of cells visited within a given time period (e.g. more than one or two selected), and the lesser number of times each such cell was selected (e.g. no more than once selected), the more likely the mobile communication device is moving quickly and is not contained within a local geographic region. The lesser the number of cells visited within the given time period (e.g. no more than one selected), and the greater the number of times each such cell was selected (e.g. more than once selected), the more likely the mobile communication device is moving slowly and is contained within a local geographic region (i.e. the mobile device is "pseudostationary"). Thus, an important characteristic for heterogeneous network selection of the present application is the rate at which the mobile communication device is traversing environments, as opposed to actual physical speed.

As described in the Background section, conventional network selection techniques make use of a hysteresis value of five (5) seconds plus a possible offset value for selection purposes. See e.g. 3GPP TS 45.008, "Technical Specification; 3rd Generation Partnership Project; Technical Specification Group GSM/EDGE Radio Access Network; Radio subsystem link control," ($3^{rd}$ Generation Partnership Project (3GPP) Technical Specification). The amount of hysteresis in a heterogeneous system (such as GSM/WLAN) is dependent on cell radius and the operational radio frequency (RF) environment. In contrast, techniques of the present application simply utilize visited cell site history information to determine whether the mobile communication device is contained within a local geographic region or is relatively stationary (i.e. "pseudostationary"). The inventive techniques need not utilize conventional hysteresis techniques to permit selection of a suitable new cell. The techniques of the present application are not dependent on variables such as some average cell size in order to make a suitable decision.

Referring now to the drawings, FIG. 1 is a schematic block diagram illustrating the basic components of a mobile communication device 102 which operates in a wireless communication system 100. As shown in FIG. 1, mobile device 102 is adapted to communicate with a wireless communication network 104 which is a cellular telecommunications network. Also as shown, mobile device 102 is adapted to communicate with a wireless local area network (WLAN) 190 such as an 802.11 based wireless network. For wireless communication with wireless network 104, mobile device 102 utilizes radio frequency (RF) transceiver circuitry 108*a* and an antenna 110*a*. For wireless communication with WLAN 190, mobile device 102 utilizes RF transceiver circuitry 108*b* for 802.11 based communications and an antenna 110*b*. With such configuration, mobile device 102 may be referred to as a "dual mode" communication device. Although shown in FIG. 1 as having separate and independent transceiver components, at least some portions or components of these otherwise different transceivers may be shared where possible.

Mobile device 102 preferably includes a visual display 112, a keyboard 114, and perhaps one or more auxiliary user interfaces (UI) 116, each of which is coupled to a controller 106. Controller 106 is also coupled to RF transceiver circuitry 108a and antenna 110a as well as RF transceiver circuitry 108b and antenna 110b. Typically, controller 106 is embodied as a central processing unit (CPU) which runs operating system software in a memory component (not shown). Controller 106 will normally control overall operation of mobile device 102, whereas signal-processing operations associated with communication functions are typically performed in the RF transceiver circuitry. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 sends communication signals to and receives communication signals over wireless communication links. For example, mobile device 102 may communicate with wireless network 104 via antenna 110a. RF transceiver circuitry 108a performs functions similar to those of a base station controller 120, including for example modulation/demodulation and possibly encoding/decoding and encryption/decryption. It is also contemplated that RF transceiver circuitry 108a may perform certain functions in addition to those performed by base station controller 120. In the embodiment shown in FIG. 1, wireless network 104 technology is configured in accordance with General Packet Radio Service (GPRS) and a Global Systems for Mobile (GSM) technologies. However, any suitable type of communication protocols may be utilized. For example, the network may be based on code division multiple access (CDMA) or other suitable technologies. It will be apparent to those skilled in art that RF transceiver circuitry 108a will be adapted to particular wireless network or networks in which mobile device 102 is intended to operate.

Mobile device 102 also includes a battery interface 122 for receiving one or more rechargeable batteries 124. Battery 124 provides electrical power to electrical circuitry in mobile device 102, and battery interface 122 provides for a mechanical and electrical connection for battery 124. Battery interface 122 is coupled to a regulator 126 which regulates power to the device. Mobile device 102 also operates using a memory module 120, such as a Subscriber Identity Module (SIM) (or e.g. a Universal SIM or U-SIM, or a Removable User Identity Module or R-UIM), which is connected to or inserted in mobile device 102 at an interface 118.

Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile device block diagram of FIG. 1, RF transceiver circuitry 108a and antenna 110a may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108a and antenna 110a of a single-unit device such as one of those described above. Such a mobile device 102 may have a more particular implementation as described later in relation to mobile station 202 of FIG. 2.

Using RF transceiver circuitry 108a, mobile device 102 communicates in and through wireless communication network 104. In the embodiment of FIG. 1, wireless network 104 is configured in accordance with GSM and GPRS technologies. Wireless network 104 includes a base station controller (BSC) 120 with an associated tower station, a Mobile Switching Center (MSC) 122, a Home Location Register (HLR) 132, a Serving GPRS Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

The town station coupled to BSC 120 may be a fixed transceiver station, and the tower station and BSC 120 may together be referred to as fixed transceiver equipment. The fixed transceiver equipment provides wireless network coverage for a particular coverage area commonly referred to as a "cell". The transceiver equipment transmits communication signals to and receives communication signals from mobile devices within its cell via the tower station. The transceiver equipment normally performs such functions as modulation and possibly encoding and/or encryption of signals to be transmitted to the mobile device in accordance with particular, usually predetermined, communication protocols and parameters, under control of its controller. The transceiver equipment similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks.

For all mobile device's 102 registered with a network operator, permanent data (such as mobile device 102 user's profile) as well as temporary data (such as mobile device's 102 current location) are stored in HLR 132. In case of a voice call to mobile device 102, HLR 132 is queried to determine the current location of mobile device 102. A Visitor Location Register (VLR) of MSC 122 is responsible for a group of location areas and stores the data of those mobile devices that are currently in its area of responsibility. This includes parts of the permanent mobile device data that have been transmitted from HLR 132 to the VLR for faster access. However, the VLR of MSC 122 may also assign and store local data, such as temporary identifications. Optionally, the VLR of MSC 122 may be enhanced for more efficient co-ordination of GPRS and non-GPRS services and functionality (e.g. paging for circuit-switched calls which may be performed more efficiently via SGSN 126, and combined GPRS and non-GPRS location updates).

SGSN 126 is at the same hierarchical level as MSC 122 and keeps track of the individual locations of mobile devices. SGSN 126 also performs security functions and access control. GGSN 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile device 102 or by the fixed transceiver equipment instructing mobile device 102 to select a particular cell. Mobile device 102 informs wireless network 104 when it reselects another cell or group of cells, known as a routing area.

In order to access GPRS services, mobile device 102 first makes its presence known to wireless network 104 by performing what is known as a GPRS "attach". This operation establishes a logical link between mobile device 102 and SGSN 126 and makes mobile device 102 available to receive, for example, pages via SGSN, notifications of incoming data, or SMS messages over GPRS. In order to send and receive GPRS data, mobile device 102 assists in activating the packet data address that it wants to use. This operation makes mobile device 102 known to GGSN 128; interworking with external data networks may thereafter commence. User data may be transferred transparently between mobile device 102 and the external data networks using, for example, encapsulation and tunneling. Data packets are equipped with GPRS-specific protocol information and transferred between mobile device 102 and GGSN 128.

Figure 2:
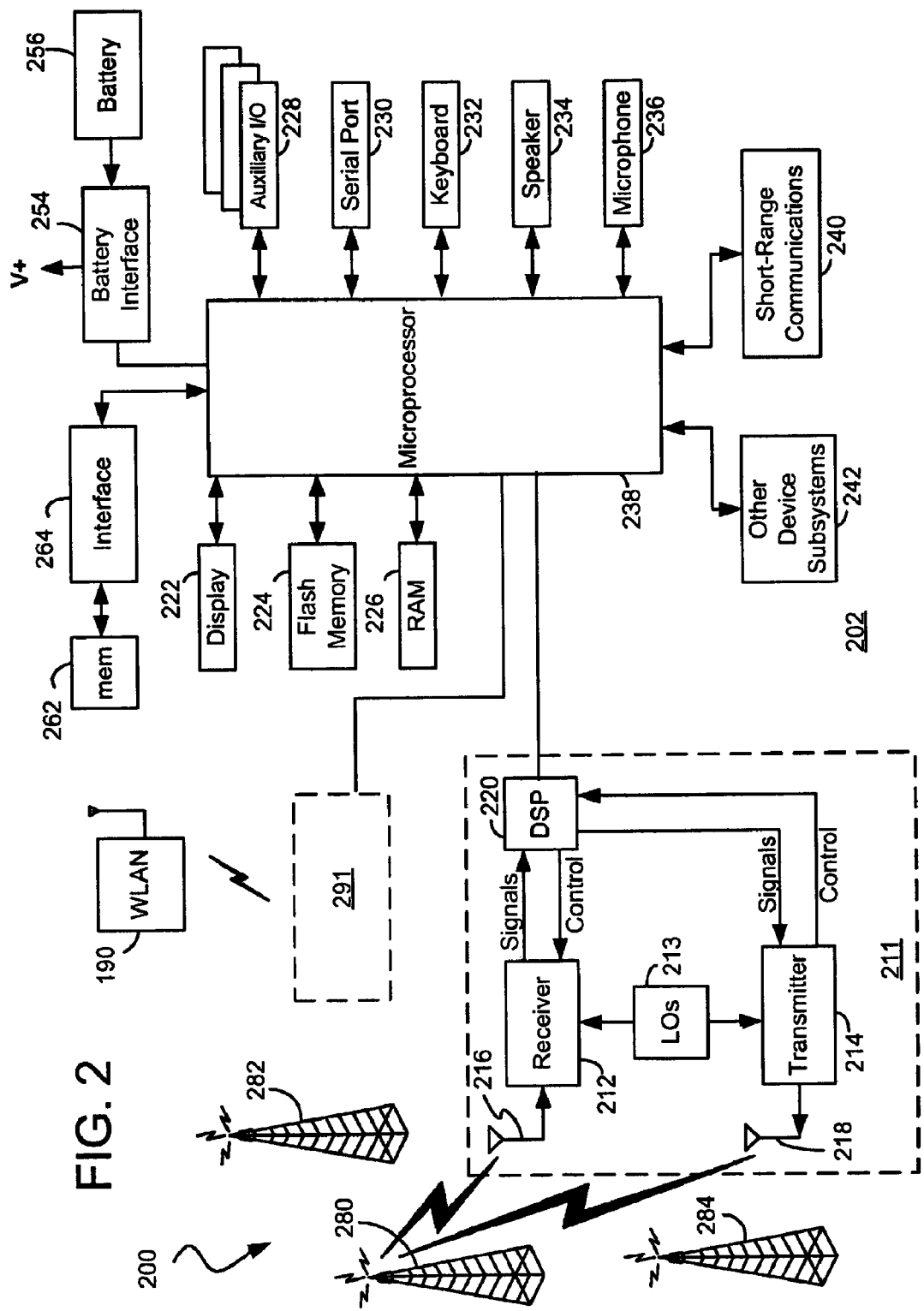
FIG. 2 is a schematic diagram of a preferred mobile communication device of FIG. 1, namely a mobile station.

FIG. 2 is a more detailed diagram of a preferred mobile device of FIG. 1, namely a mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities).

As shown, mobile station 202 is adapted to wirelessly communicate with cellular base station transceiver systems 200 of a wireless wide area network. For communication with cellular networks, mobile station 202 utilizes communication subsystem 211. As shown in FIG. 2, mobile station 202 is also adapted to wirelessly communicate with WLAN 190 using 802.11 based communications. For communication with WLANs, mobile station 202 utilizes an additional communication subsystem 291 which has the same structural components as communication subsystem 211 but employing 802.11 based communication techniques. With such configuration, mobile station 202 may be referred to as a "dual mode" mobile station. Although shown in FIG. 2 as having separate and independent subsystems, at least some portions or components of these otherwise different subsystems may be shared where possible.

Communication subsystem 211 includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108a and antenna 110a shown in FIG. 1. As will be apparent to those skilled in field of communications, particular design of communication subsystem 211 depends on the communication network in which mobile station 202 is intended to operate.

Mobile station 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card (or e.g. a Universal SIM or U-SIM, or a Removable User Identity Module or R-UIM), to be inserted in or connected to an interface 264 of mobile station 202 in order to operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown in FIG. 2) that provides power V+ to all of the circuitry.

Mobile station 202 includes a microprocessor 238 (which is one implementation of controller 106 of FIG. 1) that controls overall operation of mobile station 202. This control includes the network permission and selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications that control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile device user's corresponding data items stored and/or associated with a host computer system thereby creating a mirrored host computer on mobile station 202 with respect to such items. This is especially advantageous where the host computer system is the mobile device user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component that provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Note that although a specific mobile station 202 has just been described, any suitable mobile communication device or terminal may be part of the inventive methods and apparatus which will be described in fuller detail below. For example, some components of mobile station 202 shown and described may not be included (e.g. a full QWERTY keypad may be optional) for the device.

Figure 3:
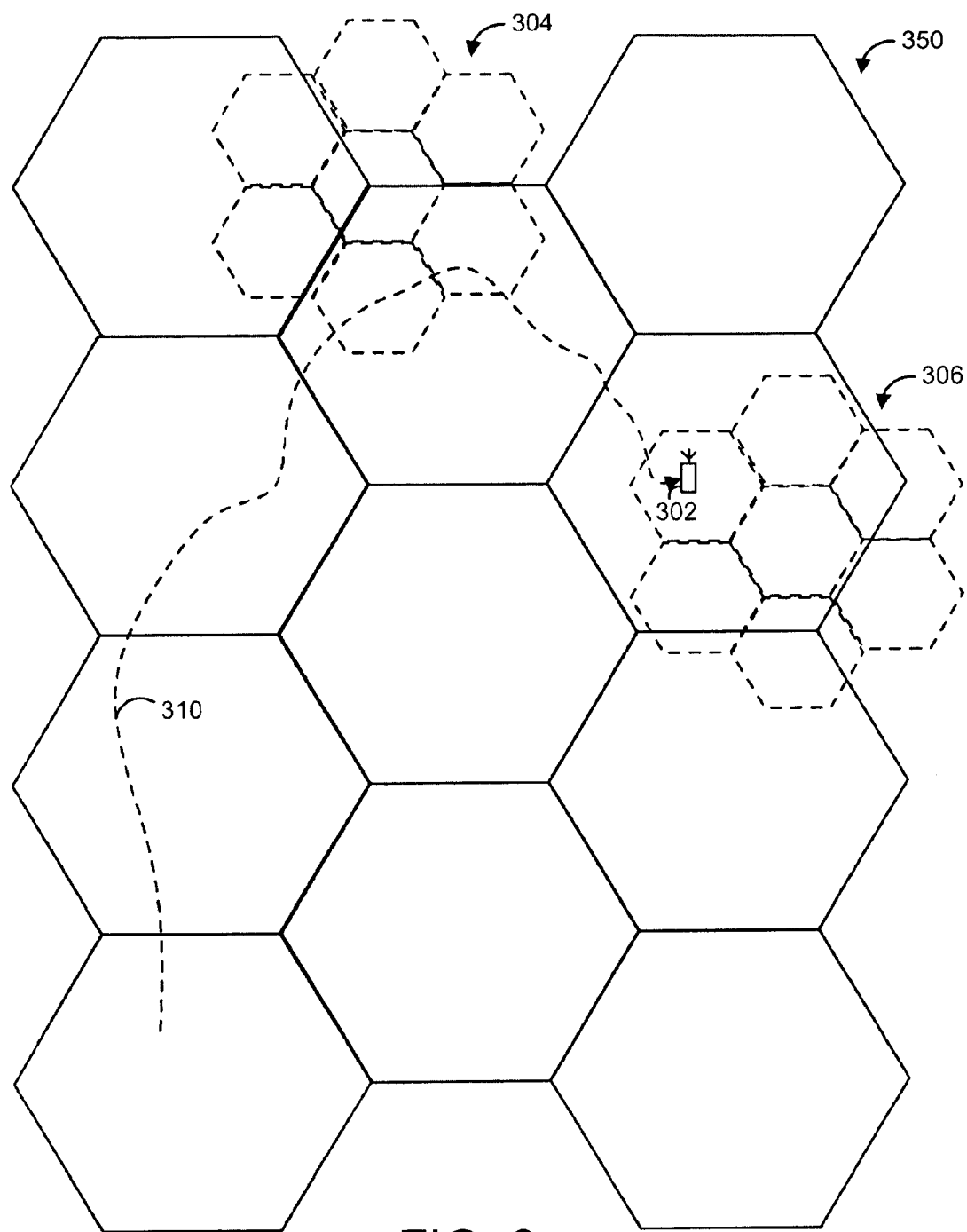
FIG. 3 is a top down view of an environment having the mobile communication device operating in the wireless communication system and travelling through cell sites of a wireless wide area network and a wireless local area network of the wireless communication system.

As described earlier above, a mobile communication device may be equipped to operate in both a wireless wide area network (WWAN) and a wireless local area network (WLAN). Today, these are considered heterogeneous networks. The problem for such a dual-mode mobile communication device is when and what variables should be considered to select one of the networks over the other. To help further depict this problem, FIG. 3 is a top down view of an environment showing a mobile communication device 302 having been carried through a wireless communication system 300 which includes one or more wireless wide area networks 350 (e.g. a GSM/GPRS network) and one or more wireless local area networks 304 and 306. Wireless wide area network 350 and wireless local area networks 304 and 306 may be referred to as heterogeneous wireless communication networks.

Mobile communication device 302 of FIG. 3 initially operates for communications in wireless wide area network 350. During such operations, mobile communication device 302 is carried along a travel path 310 through a plurality of cell sites (i.e. cell sites, cells, cell sectors, etc.) of wireless wide area network 350 and wireless local area networks 304 and 306. It is desirable to provide an automated technique in mobile communication device 302 which permits selection (e.g. automatic or manual selection) of one of wireless local area networks 304 and 306 when suitable to do so. However, mobile communication device 302 may be carried along travel path 310 so as to enter—but then quickly exit from—radio coverage of wireless local area networks 304 and 306, which may cause an undesirable short and temporary switching of communications through such networks 304 and 306. It is deemed unsuitable to permit selection of an available wireless local area network 304 or 306 when mobile communication device 302 is traversing environments too quickly. On the other hand, it is deemed suitable to permit selection of an available wireless local area network 304 or 306 when mobile communication device 302 is contained within a relatively small local geographic region or is relatively stationary or "pseudostationary."

According to techniques of the present application, the operational environment is considered a universe of "visited cells" that served mobile communication device 302 over a given period of time. Thus, visited cell site history information of wireless wide area network 350 is continually stored and updated in memory of mobile communication device 302 over a moving time period of its operation. The visited cell site history information may include different parameters, for example, the number of visited cell sites, the last time that mobile communication device 302 selected the given cell, the number of times the cell was selected by mobile communication device 302, etc. The visited cell site history information used to provide an estimation of whether mobile communication device 302 is moving "quickly" or "slowly" through the environment. The greater the number of cells visited within a given time period (e.g. more than one or two selected), and the lesser number of times each such cell was selected (e.g. no more than once selected), the more likely mobile communication device 302 is moving quickly and is not contained within any local geographic region. The lesser the number of cells visited within the given time period (e.g. no more than one selected), and the greater the number of times each such cell was selected (e.g. more than once selected), the more likely the mobile device is moving slowly and is contained within a local geographic region (i.e. the mobile device is relatively stationary or "pseudostationary"). Thus, the mobile communication device 302 makes decisions to permit or deny access to wireless local area networks with use of the visited cell site history information over a relevant time period and predetermined threshold values.

As apparent, an important characteristic for heterogeneous network selection of the present application is the rate at which mobile communication device 302 is traversing environments, as opposed to actual physical speed. Thus, the velocity considered is not physical velocity of mobile communication device 302 but rather logical velocity as defined by how long the device is likely to remain in a given cell or radio access system. Thus, one important aspect for heterogeneous radio system selection is not simply how fast mobile communication device 302 is physically traveling, but how often it has entered and exited cells and/or system boundaries.

Thus, mobile communication device 302 continually maintains visited cell site history information in its memory while providing operation for communications in wireless wide area network 350. The visited cell site history information is indicative of one or more visited cell sites (i.e. cell sites, cells, cell sectors, etc.) of wireless wide area network 350 that served mobile communication device 302 over a moving time period of its operation. The moving time period of operation may be viewed as a moving time window of consideration, and defined by a fixed time period (e.g. 1 to 2 minutes) from the current time into the past. The visited cell site history information may be or include a list of visited cell sites that served mobile communication device 302 over the moving time period, a number of visited cell sites, a number of times that mobile communication device 302 visited each cell site over the moving time period, or some or all of the above items. This information continually changes dynamically as time progresses and mobile communication device 302 traverses through different cell sites of its environment. Mobile communication device 302 "visits" or is "served" by a cell site when it operates to monitor a control channel of the cell site for receiving and/or placing voice or data calls through the cell site.

During operation, mobile communication device 302 continually monitors the visited cell site history information to identify whether it has been contained within a local geographic region over the moving time period. Put another way, mobile communication device 302 continually monitors whether it has become relatively stationary or "pseudostationary" based on the information. When mobile communication device 302 is identified to have been contained within the local geographic region (or has been "pseudostationary"), it is permitted to operate for communications in one of the wireless local area networks 304 and 306. In response to this permission, mobile communication device 302 operates to enable or activate the WLAN radio transceiver portion which was previously disabled or inactivated. If this permission is not granted, mobile communication device 302 operates to maintain operation for communications with the wireless wide area network 350 with its WWAN radio transceiver portion, and refrains from enabling or activating the WLAN radio transceiver portion. This reduces power consumption and saves battery life for mobile communication device 302.

Figure 4:
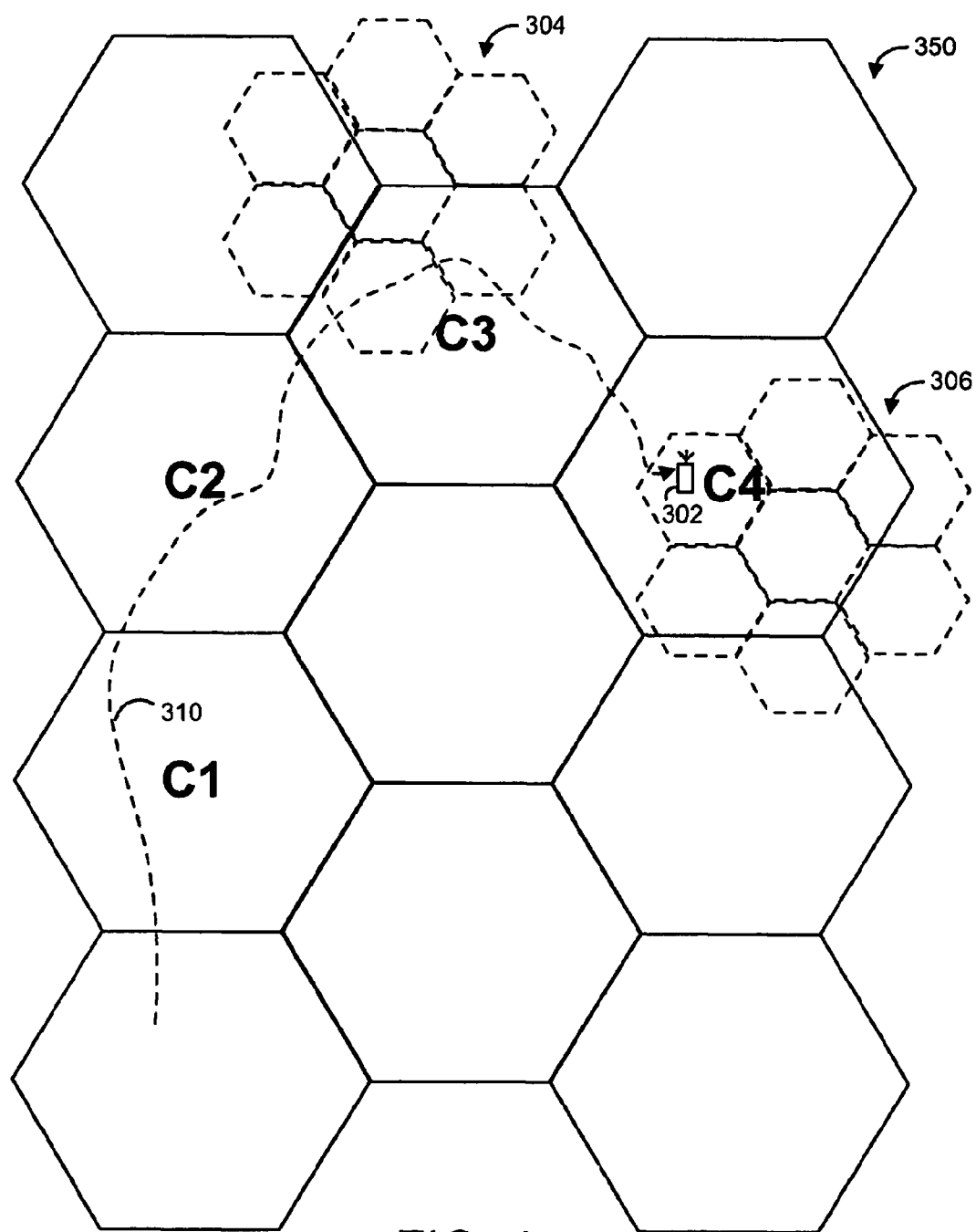
FIG. 4 is the top down view of the environment with the mobile communication device operating in the wireless communication system, showing in particular that the mobile communication device has travelled through cell sites of the wireless wide area network at a relatively fast velocity and not contained within any local geographic region.
Figure 5:
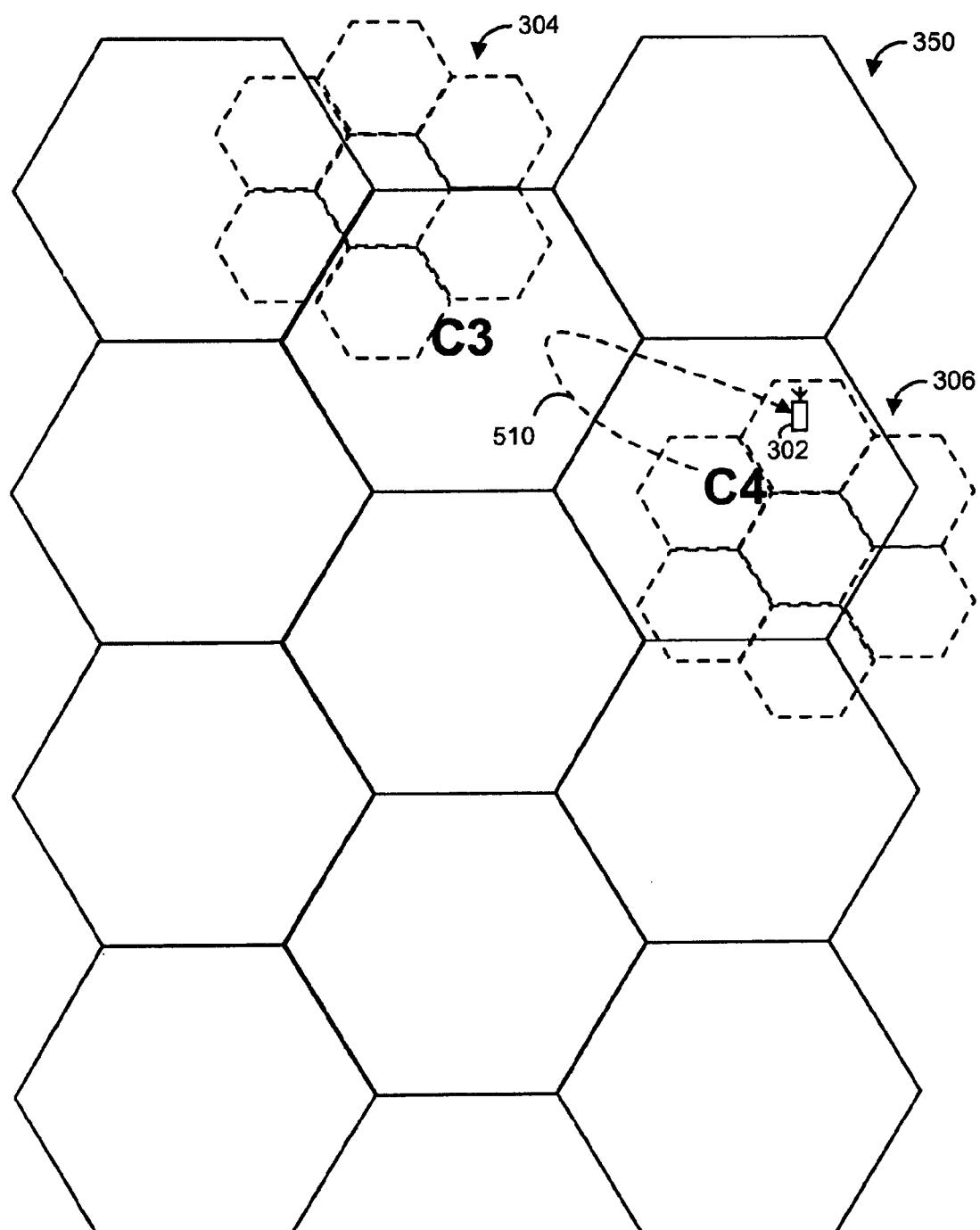
FIG. 5 is another top down view of the environment with the mobile communication device operating in the wireless communication system, showing in particular that the mobile communication device continues to travel through cell sites of the wireless wide area network albeit at a relatively slower velocity and beginning to be contained within a local geographic region.
Figure 6:
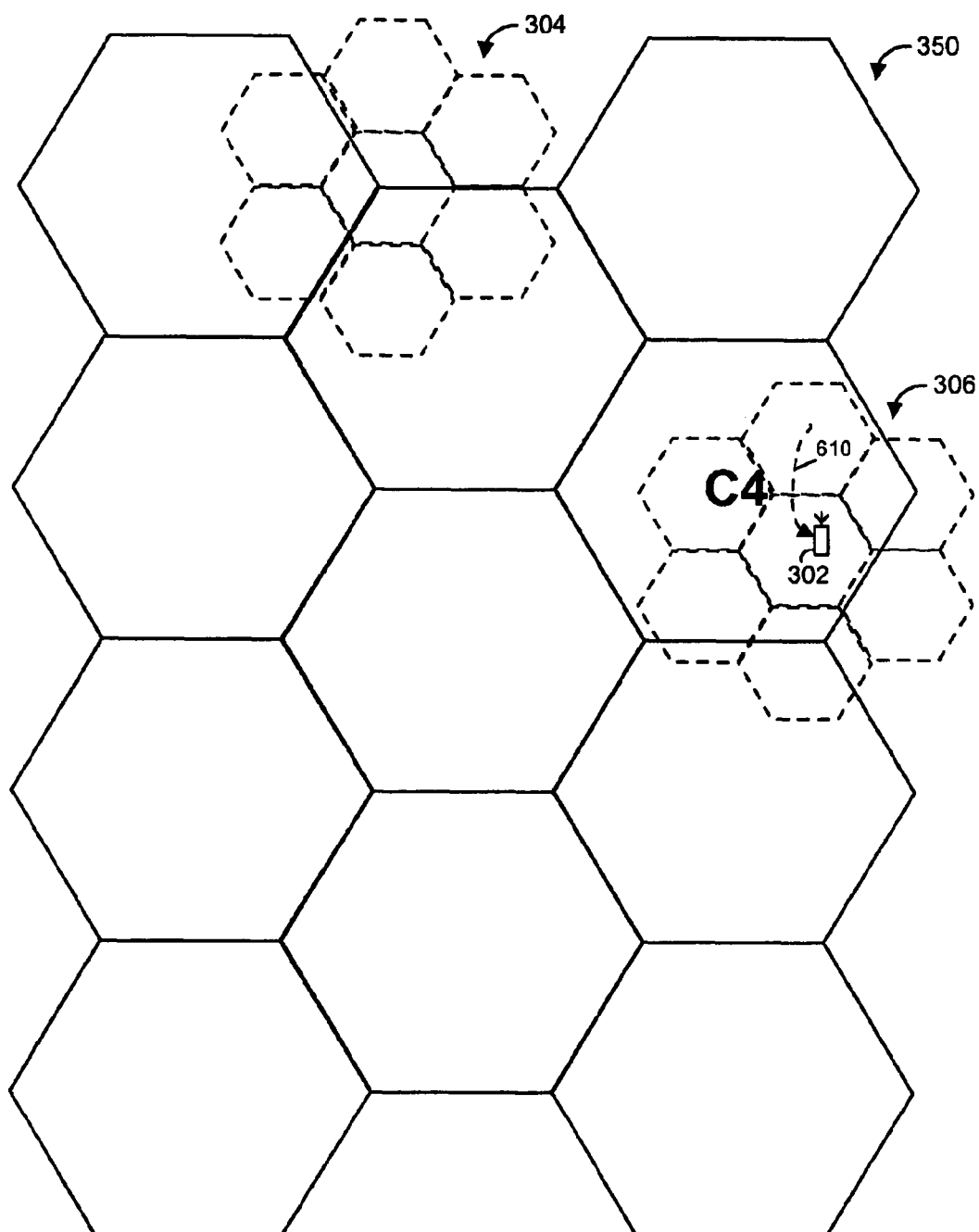
FIG. 6 is yet another top down view of the environment with the mobile communication device operating in the wireless communication system, showing in particular that the mobile communication device is travelling at a relatively slow velocity (is "pseudostationary") and contained within a local geographic region.

To further illustrate, FIGS. 4-6 show top down views of an environment where mobile communication device 302 is carried through wireless communication system 300 which includes one or more wireless wide area networks 302 (e.g. a GSM/GPRS network) and one or more wireless local area networks 304 and 306 (e.g. 802.11 based networks). Mobile communication device 302 may be the device which has been shown and described earlier in relation to FIG. 1 or 2, which makes use of one or more controllers or processors to perform the techniques of the present application.

With respect to FIGS. 4-6 briefly, mobile communication device 302 has been carried along travel path 310 of FIG. 4 through visited cell sites C1, C2, C3, and C4 ("snapshot 1"); from that point, mobile communication device 302 is further carried along a travel path 510 of FIG. 5 from visited cell site C4 to C3 and then back to C4 again ("snapshot 2"); and from that point, mobile communication device 302 is further carried along a travel path 610 of FIG. 6 entirely within visited cell site C4 ("snapshot 3"). Letters C1, C2, C3, and C4 in FIGS. 4-6 are printed in bold to indicate that the visited cell sites corresponding thereto are stored in memory of mobile communication device 302 as visited cell site history information for the current moving time period of operation.

With specific reference to FIG. 4, it is shown that mobile communication device 302 has travelled in accordance with travel path 310 through cell sites C1, C2, C3, and C4 of wireless wide area network 350 over the relevant time period of operation. Identifiers for the visited cell sites C1, C2, C3, and C4 are stored in memory as part of visited cell site history information for this current relevant time period of the moving time window. Since the number of visited cell sites (i.e. 4) is deemed to be relatively large, and the number of times any particular visited cell site has been visited (i.e. 1) is deemed to be small, mobile communication device 302 determines at this point in time that it has traversed the environment at a relatively fast velocity and has not been contained within any small local geographic region over the relevant time period. Thus, mobile communication device 302 operates to refrain from providing a permission to operate with or switch to any one of wireless local area networks 304 and 306. Mobile communication device 302 will maintain operation for communication with wireless wide area network 350.

In FIG. 5, it is shown that mobile communication device 302 has travelled further in accordance with travel path 510 through cell site C4 to C3 and then back to C4 again over the next relevant time period of operation. Identifiers for the visited cell sites C3 and C4 are stored in memory as part of the visited cell site history information for this relevant time period of the moving time window. Note that identifiers for previously visited cell sites C1 and C2 (see FIG. 4) are no longer applicable over this current time period of the moving time window. Now, the number of visited cell sites is two (2) and the number of times any particular visited cell site has been visited is also two (2) (i.e. for visited cell site C4). Mobile communication device 302 determines, based on the visited cell site history information, that it has still been traversing the environment at a relatively steady velocity and has not been sufficiently contained within any local geographic region over the relevant time period. Thus, mobile communication device 302 operates to refrain from providing a permission to operate with or switch to any one of wireless local area networks 304 and 306 at this point in time. In an alternative scenario, however, this relatively small number of visited cell sites (i.e. 2) and relatively large number of reselects (i.e. 2) causes mobile communication device 302 to provide a permission to operate with or switch to an available wireless local area network.

In FIG. 6, it is shown that mobile communication device 302 has travelled even further in accordance with travel path 610 through cell sites C4 of wireless wide area network 350 over the next relevant time period. The identifier for the current visited cell site C4 is stored in memory as part of the visited cell site history information for this time period. Note that identifiers for other previously visited cell sites (see FIGS. 4-5) are no longer applicable over this relevant time period of the moving time window. Since the number of visited cell sites (i.e. 1) is deemed to be relatively small over this time period, mobile communication device 302 determines at this point in time that it has been relatively stationary and has indeed been contained within a local geographic region over the relevant time period. In response, mobile communication device 302 operates to provide a permission to operate with or switch to a wireless local area network. Note, however, that once permission has been granted, that permission may be subsequently revoked if travel conditions such as that described in relation to FIG. 4 are resumed.

Being granted with permission in FIG. 6, mobile communication device 302 identifies that it is indeed within radio coverage of an available wireless local area network (i.e. wireless local area network 306). Since wireless local area network 306 is available and permission is granted, mobile communication device 302 may assist in switching operation for communications with wireless local area network 306. For one, mobile communication device 302 may enable or activate its WLAN radio transceiver portion for communications which was previously disabled or inactive. Since the WLAN radio transceiver portion may be activated only when usable, this reduces power consumption and saves battery life in mobile communication device 302.

If mobile communication device 302 operates in an automatic network selection mode, then it may automatically (i.e. without user intervention) switch operation for communications with wireless local area network 306. If mobile communication device 302 operates in a manual network selection mode, then it may automatically (i.e. without user intervention) cause an indicator which indicates the availability of wireless local area network 306 to be visually display in its visual display and optionally provide an audible alert. This user interface mechanism is provided to alert the end user of mobile communication device 302 to decide whether or not to select (i.e. switch to) the newly available and permitted wireless local area network. In response to an end-user actuation of an input switch of the user interface of mobile communication device 302, indicating a manual selection of wireless local area network 306, mobile communication device 302 switches operation for communications to wireless local area network 306. In an alternative approach, the indicator is provided for manual selection for a predetermined time period, however the mobile communication device 306 will automatically switch operation for communications with wireless local area network 306 unless the end user indicates a preference not to switch to it within the predetermined time period. When switching is performed (whether automatic or manual or other), mobile communication device 302 operates to switch use of its appropriate radio or RF transceiver portions corresponding to the appropriate wireless communication network.

Figure 7:
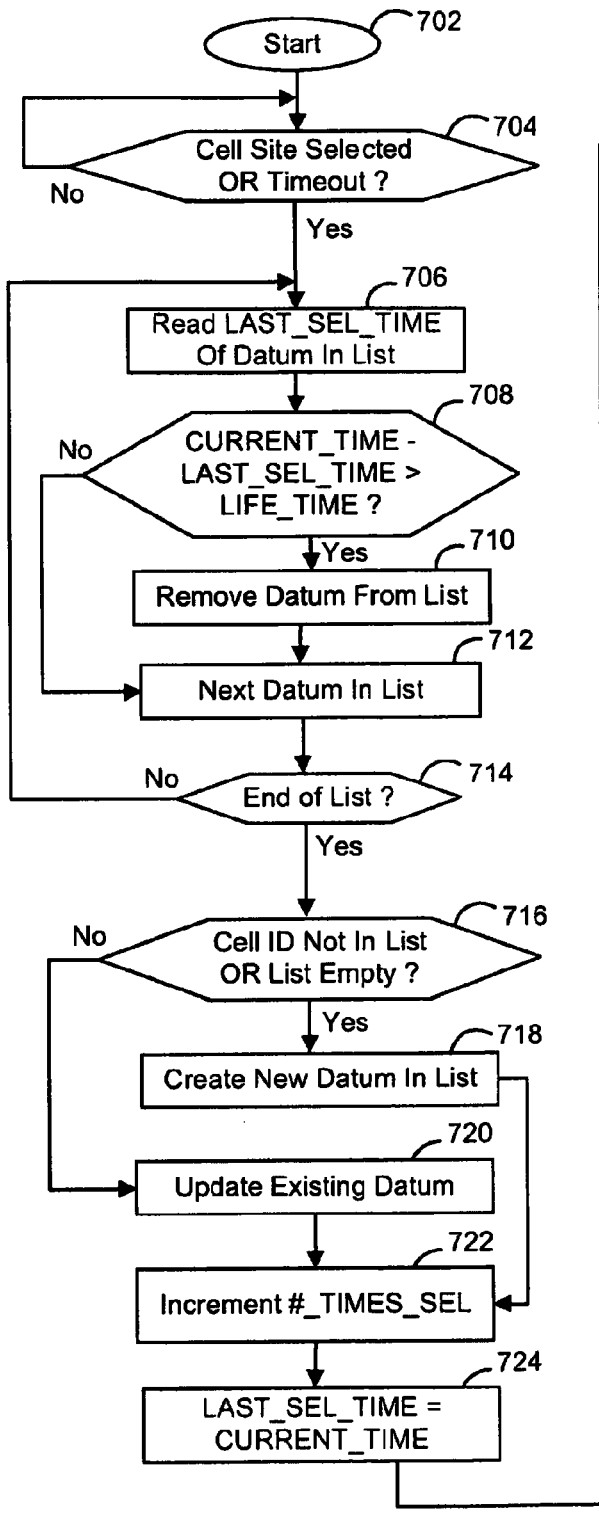
FIG. 7 is a flowchart which helps describe a preferred detailed technique for use by the mobile communication device in selecting between the wireless wide area network and the wireless local area network.
Figure 7:
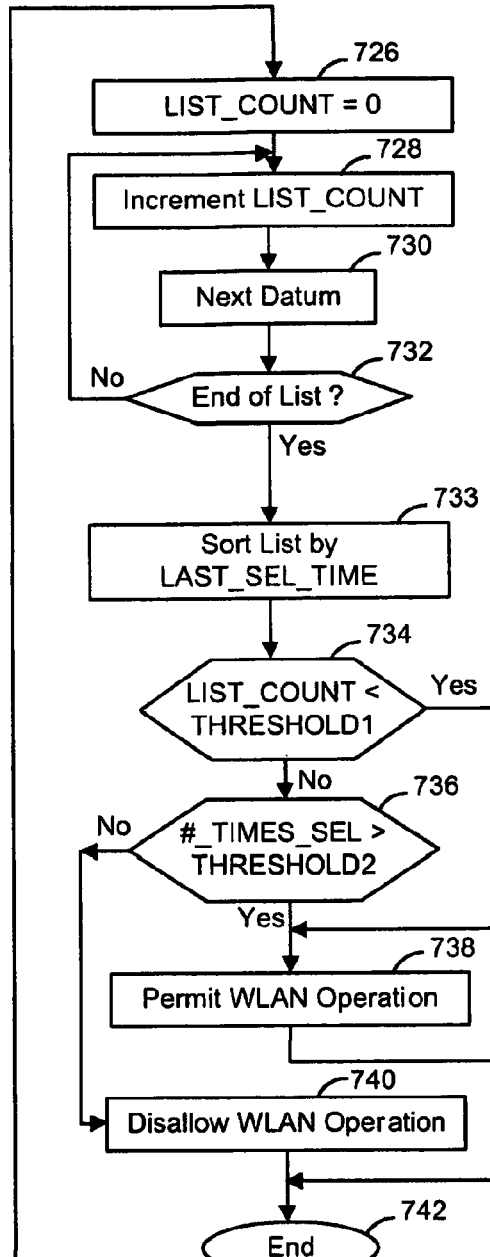

FIG. 7 is a flowchart which helps describe a preferred detailed technique for use by a mobile communication device in selecting between a wireless wide area network and a wireless local area network. The mobile communication device may be that which has been shown and described earlier in relation to FIG. 1 or 2, operating in accordance with FIGS. 4-6 described above, and making use of one or more controllers or processors to perform the techniques.

Figure 8:
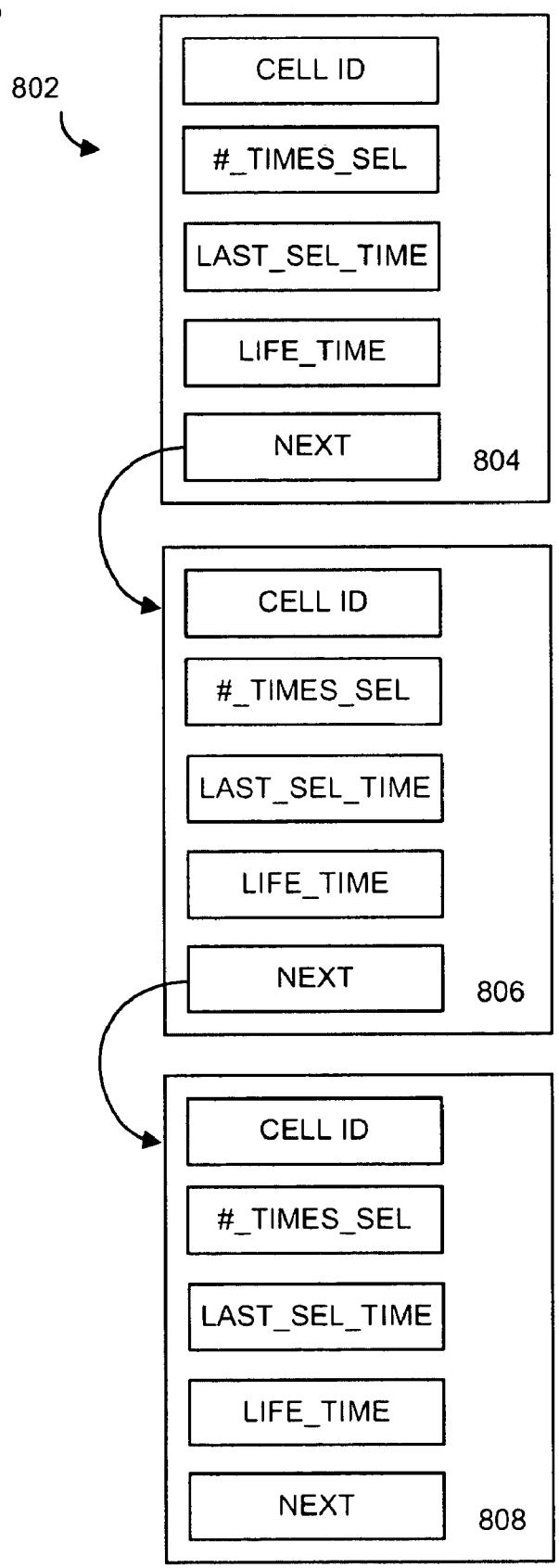
FIG. 8 is an illustrative depiction of one example of visited cell site history information which is maintained by the mobile communication device for use in the present techniques, showing in particular a linked list of visited cell site characteristics of the wireless wide area network.

Prior to traversing the steps in the flowchart of FIG. 7, a description of exemplary visited cell site history information and variables are described with reference to FIG. 8. In FIG. 8, a linked list 802 of visited cell site history information is shown. The visited cell site history information in list 802 represents all of the visited cell sites of the wireless wide area network that served the mobile device over a moving time period of its operation. Again, this information continually changes dynamically as time progresses and the mobile device traverses through different cell sites of its environment. As shown, list 802 includes a sublist entry or datum associated with each visited cell site. In this instance, list 802 has three sublist entries which include a sublist entry 804, a sublist entry 806, and a sublist entry 808. Each sublist entry of list 802 includes a CELL_ID item (a unique identifier corresponding to the visited cell site), a #_TIMES_SEL item (a number of times the visited cell site was selected by the mobile communication device over the time period), a LAST_SEL_TIME item (a timestamp corresponding to the last or most recent time at which the cell site was selected by the mobile communication device), a LIFE_TIME item (a timestamp corresponding to the time at which the identifier of the cell site should be removed from list 802, which defines the moving time window), and a NEXT item (an address or pointer address to the next sublist entry of list 802 or empty). The visited cell site history information further reflects a count of the number of visited cell sites (LIST_COUNT) which may be explicitly provided or tallied at any suitable time.

Beginning at a start block 702 of FIG. 7, the mobile communication device identifies whether a new cell site of the wireless wide area network has been selected, or whether an expiration of a timer has occurred (step 704 of FIG. 7). When a cell site is selected by the mobile communication device, the mobile device operates to monitor a control channel of the cell site for receiving and/or placing voice or data calls through the cell site. The selection of a new cell site or the expiration of the timer of the mobile device triggers the mechanism for processing and maintaining the visited cell site information. If a cell site has been selected or the timer has expired in step 704, the processor of the mobile communication device reads the LAST_SEL_TIME (step 706 of FIG. 7) for the first sublist entry or datum of the list and calculates whether CURRENT_TIME−LAST_SEL_TIME>LIFE_TIME (step 708 of FIG. 7). Step 708 is generally utilized to determine whether this particular visited cell site is outside of the moving time window of operation. The value of LIFE_TIME which defines the moving time window may be, for example, 1 to 2 minutes. If step 708 is true, then the sublist entry or datum is removed from the list (step 710 of FIG. 7) and the next datum is selected (step 712 of FIG. 7). Otherwise from step 708, the processor merely moves on to the next datum of the list in step 712. Steps 706 through 712 are repeated for each sublist entry or datum in the list, with use of a test to identify whether the end of the list has been reached (step 714 of FIG. 7).

Next, the processor of the mobile communication device then identifies if the newly-selected cell site is already included in the list or if the list is currently empty (step 716 of FIG. 7). If the newly-selected cell site is not already found in the list or the list is currently empty at step 716, then the processor causes a new datum entry corresponding to the newly-selected cell site to be inserted in the list (step 718 of FIG. 7). Otherwise from step 716, step 718 is skipped and the existing datum for the cell site is merely identified and updated (step 720 of FIG. 7). From step 720, the #_TIMES_SEL is incremented (step 722 of FIG. 7) and the LAST_SEL_TIME is set to the CURRENT_TIME (step 724 of FIG. 7). The processor then counts the number of visited cell sites over the moving time period of the mobile device's operation to produce LIST_COUNT. Specifically, LIST_COUNT is initially set to zero (step 726 of FIG. 7) and then processor increments LIST_COUNT (step 728 of FIG. 7) for each datum in the list (step 730) until the end of the list is identified (step 732 of FIG. 7). The processor also then sorts the list in chronological order according to LAST_SEL_TIME (step 733 of FIG. 7), from earliest to latest or from latest to earliest.

The processor then performs the basic tests to identify whether the mobile communication device should be permitted to operate for communications in any available wireless wide area network. Specifically, the processor compares whether LIST_COUNT is less than a first predetermined threshold called THRESHOLD1 (step 734 of FIG. 7). If LIST_COUNT<THRESHOLD1 in step 734, then a permission for WLAN operation is provided by the processor (step 738 of FIG. 7). Step 738 may be provided specifically by setting some indication in memory, such as a bit flag ('1'=permitted, '0'=not permitted), for example. Radio transceiver operations may be switched appropriately to enable WLAN operation in the mobile communication device. If LIST_COUNT is greater than or equal to THRESHOLD1 in step 734, then the processor compares whether #_TIMES_SEL> is greater than a second predetermined threshold called THRESHOLD2 (step 736 of FIG. 7). If #_TIMES_SEL>THRESHOLD2 in step 736, then a permission for WLAN operation is provided by the processor (step 738 of FIG. 7). If both tests in step 736 and step 738 are negative, then the processor refrains from providing a permission for WLAN operation and WLAN operation is not granted (step 740 of FIG. 7). Alternatively, permission for WLAN operation in step 738 is provided only if both tests in step 734 and step 736 are positive; if one of the tests in step 734 or step 736 is negative, the permission for WLAN operation is not granted. After permission is granted, the WLAN radio transceiver portion may be enabled or activated; otherwise it is not enabled or activated. An end block 742 of the flowchart is shown following steps 738 and 740, however the flowchart repeats for additional cell site selections and/or other suitable triggering events.

The flowchart of FIG. 7 may also be represented further by the following computer logic:

```
START (mobile station selects a cell OR timer timeout)
    FOR (all List data)
        IF (CURRENT_TIME − LAST_SEL_TIME > LIFE_TIME)
            THEN Remove Datum From List
        ENDIF
    ENDFOR
    (Search for Cell ID on existing List)
    IF (Cell ID not on List OR List empty)
        THEN Create new datum for new Cell ID
    ELSE (Datum for Cell ID already in List)
        Update datum info
        Increment #_TIMES_SEL
        LAST_SEL_TIME = CURRENT_TIME
    ENDIF
    Set LIST_COUNT = 0
    FOR (all List data)
        Increment LIST_COUNT
    ENDFOR
    Sort List by LAST_SEL_TIME
    IF
        (LIST_COUNT < THRESHOLD1)
        AND
        (#_TIMES_SEL > THRESHOLD)
    THEN
        Permit WLAN Communications
        WLAN transceiver or mode enabled
    ELSE
        Disallow WLAN Communications
        WLAN transceiver or mode disabled
    ENDIF
END
```

Figure 9:
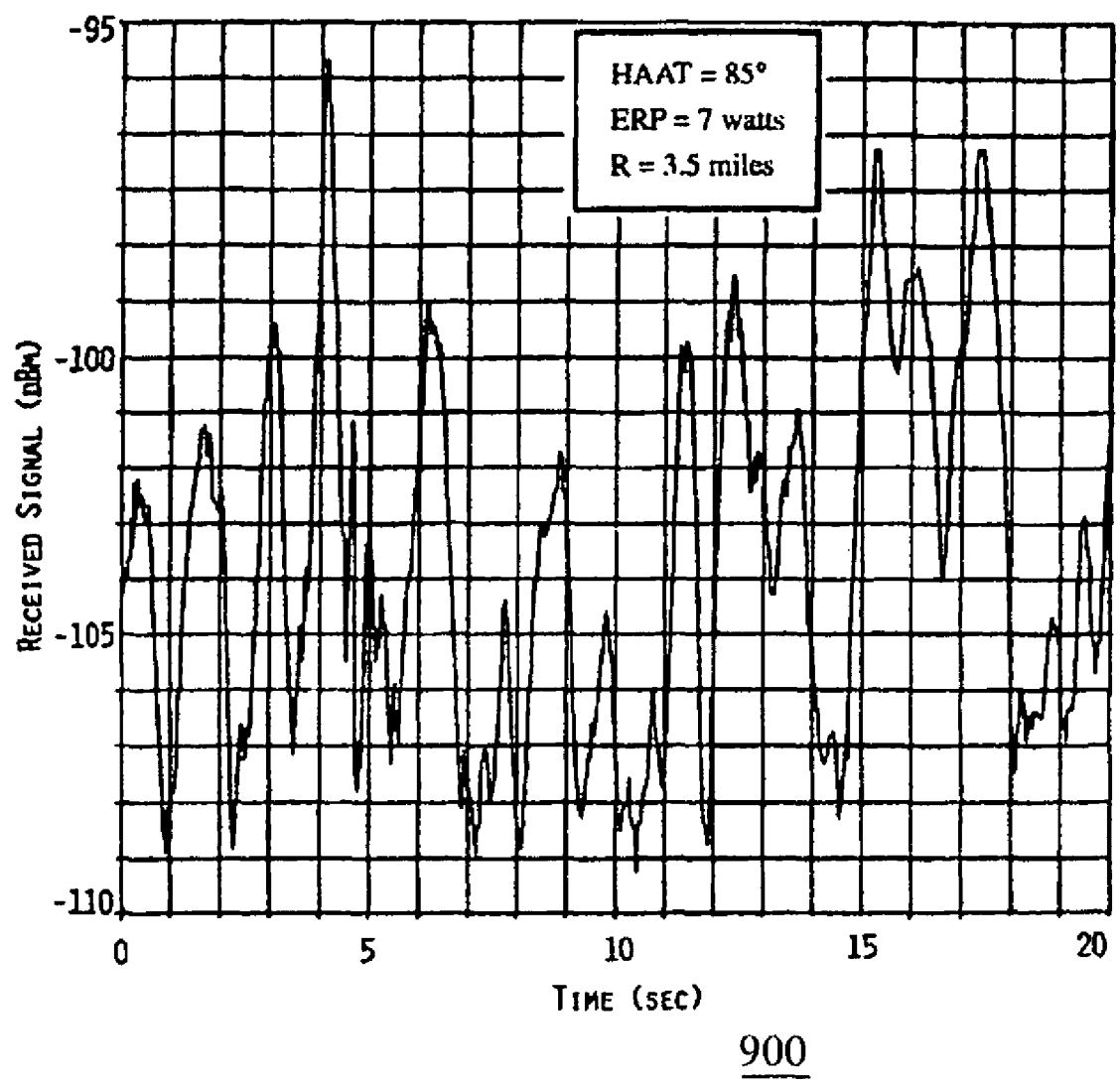
FIG. 9 is a graph depicting varying signal strengths of an RF signal of a mobile communication device which is relatively stationary.

Although a mobile communication may actually be physically stationary, it may nonetheless select and reselect a plurality of different surrounding cells over time. FIG. 9 is a graph 900 depicting a varying signal strength of an RF signal of a mobile communication device which is relatively stationary. Specifically, graph 900 reveals an exemplary time variation of a 900 MHz CW signal received at a vehicle parked on a suburban street, taken from *Radio Propagation for Modern Wireless Systems* by Henry L. Bertoni, Prentice-Hall, Inc., 2000, page 34, FIGS. 2-12. As shown, the signal strength of the signal varies substantially despite the mobile communication device being stationary. This wide signal variation causes the mobile communication device to select and reselect a plurality of different surrounding cells even while stationary.

Figure 10:
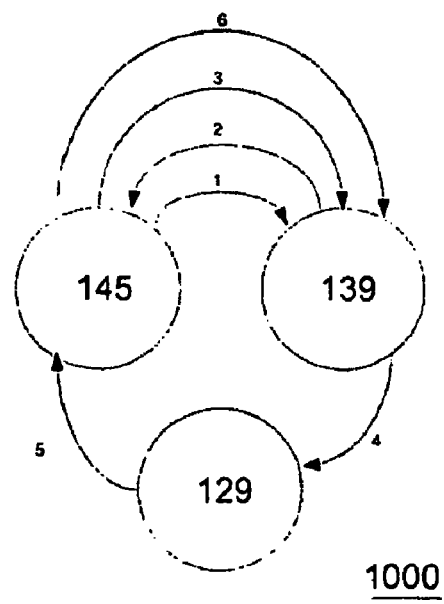
FIG. 10 is a cell state flow diagram of a mobile communication device based on an actual operating test when the mobile communication device was kept relatively stationary.
Figure 11:
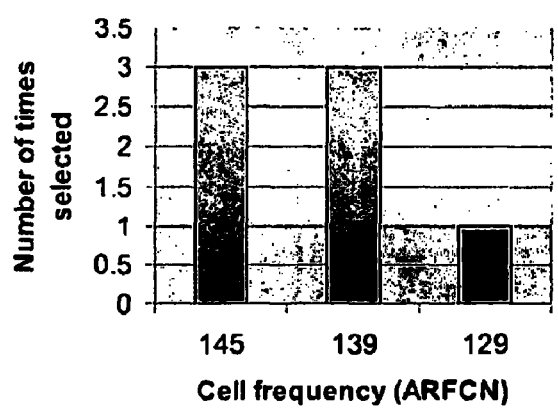
FIG. 11 is a graph which graphically illustrates cell selection and reselection data of FIG. 10.

FIG. 10 is a cell switching flow diagram of a mobile communication device based on an actual operating test when the mobile communication device was kept relatively stationary. The varying nature of the received signals (e.g. see FIG. 9) causes the mobile communication device to select and reselect different cells (cells 145, 139, and 129 of FIG. 10). As illustrated in FIG. 10, the mobile communication device initially selected cell 145, then switched to cell 139, then switched back to cell 139, then switched to a new cell 129, back to cell 145, and back again to cell 139. FIG. 11 is a graph 1100 which graphically illustrates the cell selection and reselection diagram of FIG. 10. Actual extended data generated from selection and reselection of cells include the following:

2051.7 c 145-76 BCCH/N SysInfo 4 MCC:302 MNC:720 LAC:1B6C
2028.1 c 139-80 BCCH/N SysInfo 4 MCC:302 MNC:720 LAC:1B6C
2002.2 c 129-95 BCCH/N SysInfo 4 MCC:302 MNC:720 LAC:1B6C
1990.5 c 145-75 BCCH/N SysInfo 4 MCC:302 MNC:720 LAC:1B6C
1964.8 c 140-83 BCCH/N SysInfo 4 MCC:302 MNC:720 LAC:1B6C
1943.4 c 133-94 BCCH/N SysInfo 4 MCC:302 MNC:720 LAC:1B6C
1867.8 c 128-98 BCCH/N SysInfo 4 MCC:302 MNC:720 LAC:1B6C
1775.8 c 139-67 BCCH/N SysInfo 4 MCC:302 MNC:720 LAC:1B6C
1773.6 c 128-96 BCCH/N SysInfo 4 MCC:302 MNC:720 LAC:1B6C
1772.7 c 140-83 BCCH/N SysInfo 4 MCC:302 MNC:720 LAC:1B6C
1534.8 c 139-76 BCCH/N SysInfo 4 MCC:302 MNC:720 LAC:1B6C
331.116 c 581-76 BCCH/N SysInfo 4 MCC:302 MNC:720 LAC:1B6C
275.987 c 139-73 BCCH/N SysInfo 4 MCC:302 MNC:720 LAC:1B6C 63.201 c 133-91 BCCH/N SysInfo 4 MCC:302 MNC:720 LAC:1B6C 12.058 c 128-92 BCCH/N SysInfo 4 MCC:302 MNC:720 LAC:1B6C These test data were taken from a stationary mobile communication device on a Roger's network in Waterloo, Ontario, Canada. These test data suggest suitable thresholds for use in switching between WWAN and WLAN of the present application. For example, the threshold for the number of selected cells may preferably be set to greater than one and the threshold for the number of reselected cells may preferably be set to greater than one, but the threshold for the number of selected cells should not be set too low so as to trigger false WWAN to WLAN switching indications.

Thus, methods and apparatus for use by a mobile communication device in switching operation for communications from a wireless wide area network (WWAN) to a wireless local area network (WLAN) have been described. While providing operation for communications in the WWAN, the mobile device continually maintains visited cell site history information in its memory. The visited cell site history information is indicative of all of the visited cell sites of the WWAN that served the mobile device over a moving time period of its operation. The visited cell site history information may be or include a list of visited cell sites that served the mobile device over the moving time period, a number of visited cell sites, a number of times that the mobile device visited each cell site over the moving time period, or some or all of the above, as examples. The moving time period may be defined by a fixed time period from the current time into the past. The mobile device continually monitors the visited cell site history information to identify whether it has been contained within a local geographic region over the moving time period. Put another way, the mobile device continually monitors whether it is relatively stationary or "pseudostationary" based on this information. When the mobile device is identified to have been contained within the local geographic region (or has been "pseudostationary"), it is permitted to operate for communications in the WLAN; otherwise it is not so permitted. In response to such permission, the mobile device operates to enable or activate its WLAN radio transceiver portion which was previously disabled or inactivated. If this permission is not granted, the mobile device operates to maintain operation for communications with the WWAN with its WWAN radio transceiver portion, and refrains from enabling or activating the WLAN radio transceiver portion. When a WLAN is available for communications with the mobile device, operation for communications is switched to the WLAN if it is determined that the mobile device is permitted to operate in the WLAN, but operation for communications is maintained in the WWAN if it is not so determined.

As previously described, the visited cell history information may include a list of identifiers associated with the visited cell sites that served the mobile communication device over the moving time period of operation. The visited cell site history information may further include or reflect a number of visited cell sites of the wireless wide area network that served the mobile communication device over the moving time period of operation, where the determination is made based on the number of visited cell sites. The visited cell site history information may further include or reflect a number of times each one of the visited cell sites served the mobile communication device over the moving time period of operation, where the determination is made based on a number of times a visited cell site served the mobile communication device over the moving time period of operation. The visited cell site history information may further include a time indicator which is indicative of a time at which a visited cell site served the mobile communication device over the moving time period of operation.

A mobile communication device of the present application has a first wireless transceiver portion which is adapted to operate for communications with a wireless wide area network, a second wireless transceiver portion which is adapted to operate for communications with a wireless local area network, one or more processors coupled to the first and the second wireless transceiver portions, and memory coupled to the one or more processors. The one or more processors are operative to provide operation for communications in the wireless wide area network with use of the first wireless transceiver portion; continually maintain, in the memory, visited cell site history information which is indicative of one or more visited cell sites of the wireless wide area network that served the mobile communication device over a moving time period of operation of the mobile communication device; and determine, based on the visited cell site history information, whether the mobile communication device is permitted to operate for communications in the wireless local area network with use of the second wireless transceiver portion. In response to this permission, the mobile device operates to enable or activate its second radio transceiver portion which was previously disabled or inactivated. If this permission is not granted, the mobile communication device operates to maintain operation for communications with the wireless wide area network with its first radio transceiver portion, and refrains from enabling or activating the other portion.

A communication system includes one or more wireless wide area networks, one or more wireless local area networks, and one or more mobile communication devices which are adapted to operate for communications in both the wireless wide area network and the wireless local area network. Each mobile communication device is operative to provide operation for communications in the wireless wide area network with use of a first wireless transceiver portion; continually maintain, in memory, visited cell site history information which is indicative of one or more visited cell sites of the wireless wide area network that served the mobile communication device over a moving time period of operation of the mobile communication device; and determine, based on the visited cell site history information, whether the mobile communication device is permitted to operate for communications in the wireless local area network with use of a second wireless transceiver portion.

Although the detailed description focuses on the use of two specific networks (namely a cellular network as the WWAN and a 802.11 network as the WLAN), any two suitable heterogeneous networks may be utilized, where one of the networks has overlapping coverage with or is contained within the other network. As apparent, the above-described embodiments of the present application are intended to be examples only. Those of skill in the art may effect alterations, modifications and variations to the embodiments without departing from the scope of the application.

What is claimed is:

1. A method for switching operations in a device from a first network to a second network, the method comprising:
providing operation for communications in the first network with use of a first transceiver portion operative for communications in the first network, while a second transceiver portion operative for communications in the second network is disabled, wherein during operations in the first network:
storing, in memory, visited cell site history information, wherein the visited cell site history information including at least a cell site count of visited cell sites of the first network that served the device over a time period of operation of the device;

determining that the device is not permitted to operate for communications in the second network and maintaining the second transceiver portion as disabled based on identifying that the cell site count is greater than a cell site threshold count; and determining that the device is permitted to operate for communications in the second network and enabling the second transceiver portion for communications based on identifying that the cell site count is less than the cell site threshold count.

2. The method of claim 1, further comprising:
during operations in the first network: repeating the recited acts of storing and determining.

3. The method of claim 1, further comprising:
when the second network is available for communications with the device:
switching operation for communications to the second network with use of the second transceiver portion if it is determined that the device is permitted to operate in the second network.

4. The method of claim 1, wherein the first transceiver portion and the second transceiver portion being in a single transceiver.

5. The method of claim 1, wherein the visited cell site history information further comprises a cell reselection count of the number of times a visited cell site was selected by the device over the time period of operation, and the acts of determining that the device is permitted to operate for communications in the second network and enabling the second transceiver portion for communications are based on both identifying that the cell site count is less than the cell site threshold count and identifying that the cell reselection count is greater than a cell reselection threshold count.

6. The method of claim 1, wherein the visited cell history information comprises a list of identifiers associated with the visited cell sites that served the device over the time period of operation.

7. The method of claim 1, further comprising:
wherein the visited cell site history information further comprises a cell reselection count of the number of times a visited cell site was selected by the device over the time period of operation;
wherein the acts of determining that the device is permitted to operate for communications in the second network and enabling the second transceiver portion for communications is based on both identifying that the cell site count is less than the cell site threshold count and identifying that the cell reselection count is greater than a cell reselection threshold count; and
determining that the device is not permitted to operate for communications in the second network and maintaining the second transceiver portion as disabled based on identifying that the cell reselection count is less than the cell reselection threshold count.

8. The method of claim 1, further comprising:
causing an indicator which indicates that the second network is permitted for communications to be displayed in a visual display of the device.

9. The method of claim 1, wherein the first network comprises a first communications network and the second network comprises a second communications network.

10. A device, comprising:
a first transceiver portion which is operative for communications with a first network;
a second transceiver portion which is operative for communications with a second network, the second network having a plurality of local area coverage cells which are contained within one or more cells of the first network;
one or more processors coupled to the first and the second transceiver portions, wherein the one or more processors being operative to:
provide operation for communications in the first network with use of the first transceiver portion while the second transceiver portion is disabled;
store, in the memory, visited cell site history information, wherein the visited cell site history information including at least a cell site count of visited cell sites of the first network that served the device over a time period of operation of the device;
determine that the device is not permitted to operate for communications in a second network and therefore maintain the second transceiver portion as disabled based on identifying that the cell site count is greater than a cell site threshold count; and
determine that the device is permitted to operate for communications in the second network to therefore enable the second transceiver portion for communications based on identifying that the cell site count is less than the cell site threshold count.

11. The device of claim 10, wherein the one or more processors are further operative to:
when the second network is available for communications with the device:
switch operation for communications to the second network if it is determined that the device is permitted to operate in the second network.

12. The device of claim 10, wherein the one or more processors are further operative to repeat the acts of storing and determining during operations in the first network.

13. The device of claim 10, wherein the one or more processors are further operative to switch operation for communications from the first network to the second network based on determining that the device is permitted to operate in the second network.

14. The device of claim 10, wherein the visited cell site history information further comprises a cell reselection count of the number of times a visited cell site was selected by the device over the time period of operation, and the one or more processors are further operative to determine that the device is permitted to operate for communications in the second network based on both identifying that the cell site count is less than the cell site threshold count and identifying that the cell reselection count is greater than a cell reselection threshold count.

15. The device of claim 10, wherein the visited cell history information further comprises a list of identifiers associated with the visited cell sites that served the device over the time period of operation.

16. The device of claim 10, wherein the visited cell site history information further comprises a time indicator which is indicative of a time at which a visited cell site served the device over the time period of operation.

17. The device of claim 10, wherein the first network comprises a first communications network and the second network comprises a second communications network.

18. The device of claim 10, wherein the first transceiver portion and the second transceiver portion being within a single transceiver.

19. A method for a device in switching operation for communications from a first network to a second network, the method comprising:

providing operation for communications in the first network with use of a first transceiver portion operative for communications in the first network, while a second transceiver portion operative for communications in the second network is disabled, wherein during operations in the first network:
storing, in memory, visited cell site history information, wherein the visited cell site history information including at least a cell reselection count of the number of times a visited cell site was reselected by the device over a time period of operation of the device;
determining that the device is not permitted to operate for communications in the second network and maintaining the second transceiver portion as disabled based on identifying that the cell reselection count is less than the a cell reselection threshold count; and
determining that the device is permitted to operate for communications in the second network and enabling the second transceiver portion for communications based on identifying that the cell reselection count is greater than the cell reselection threshold count.

20. The method of claim 19, wherein the first transceiver portion and the second transceiver portion being within a single transceiver.

21. The method of claim 19, further comprising during operations in the first network: repeating the recited acts of storing and determining.

22. The method of claim 19, further comprising:
when the second network is available for communications with the device:
switching operation for communications to the second network with use of the second transceiver portion if it is determined that the device is permitted to operate in the second network.

23. The method of claim 19, wherein the first transceiver portion and the second transceiver portion are contained within a single transceiver.

24. The method of claim 19, wherein the visited cell site history information further comprises a cell site count of the number of times a visited cell site was selected by the device over the time period of operation, and the acts of determining that the device is permitted to operate for communications in the second network and enabling the second transceiver portion for communications are based both identifying that the cell site count is less than a cell site threshold count and identifying that the cell reselection count is greater than the cell reselection threshold count.

25. The method of claim 19, wherein the first network comprises a first communications network and the second network comprises a second communications network.

* * * * *